(12) United States Patent
Seguin

(10) Patent No.: US 11,857,893 B2
(45) Date of Patent: Jan. 2, 2024

(54) FLUID TREATMENT SEPARATOR AND A SYSTEM AND METHOD OF TREATING FLUID

(71) Applicant: 1501367 Alberta Ltd., Delta (CA)

(72) Inventor: Ronald J. Seguin, Delta (CA)

(73) Assignee: 1501367 Alberta Ltd., Delta (CA)

( * ) Notice: Subject to any disclaimer, the term of this patent is extended or adjusted under 35 U.S.C. 154(b) by 44 days.

(21) Appl. No.: 17/399,930

(22) Filed: Aug. 11, 2021

(65) Prior Publication Data
US 2022/0054956 A1    Feb. 24, 2022

(30) Foreign Application Priority Data

Aug. 18, 2020 (CA) ................................ CA 3090353

(51) Int. Cl.
  *B01D 17/02* (2006.01)
  *B01D 17/12* (2006.01)
  (Continued)

(52) U.S. Cl.
  CPC ..... *B01D 17/0217* (2013.01); *B01D 17/0205* (2013.01); *B01D 17/0214* (2013.01);
  (Continued)

(58) Field of Classification Search
  CPC ........... B01D 17/0205; B01D 17/0211; B01D 17/0214; B01D 17/0217; B01D 17/0208;
  (Continued)

(56) References Cited

U.S. PATENT DOCUMENTS 2,180,811 A * 11/1939 King ................. B01D 17/0217
                                                            210/533
2,730,240 A    1/1956 Johnson
(Continued)

FOREIGN PATENT DOCUMENTS

CA        1152855        8/1983
CA        1164383        3/1984
(Continued)

OTHER PUBLICATIONS

"Cavitation Sparging System Enhanced Flotation col. Flotation", Canadian Process Technologies Inc. Brochure, 8 pgs [downloaded from the internet but published at least as early as the priority date of the current application.].

(Continued)

*Primary Examiner* — Joseph W Drodge
(74) *Attorney, Agent, or Firm* — CHRISTENSEN O'CONNOR JOHNSON KINDNESS PLLC

(57) ABSTRACT

There is provided a method of treating fluid such as tailings from tailings ponds resulting from oil sands production. A fluid treatment separator has a separation chamber having an oil outlet and a water chamber having a water outlet below the height of the oil outlet. A fluid passage connects between the separation and water chambers. The fluid passage is below the height of the water outlet. A centrifuge flow separator is in the separation chamber. A centrifuge flow diffuser is oriented to direct mixed fluids into the centrifuge flow separator. Preferably, the centrifuge flow diffuser is a ring diffuser and the centrifuge flow separator is a centrifuge cone. A fluid treatment system includes a fluid treatment separator and a phase separator and may include multiple fluid treatment separators and phase separators connected in series.

20 Claims, 6 Drawing Sheets

(51) Int. Cl.
  *B01D 17/04* (2006.01)
  *C02F 9/00* (2023.01)
  *C02F 1/24* (2023.01)
  *C02F 1/40* (2023.01)
  *C02F 1/56* (2023.01)
  *C02F 1/38* (2023.01)
  C02F 101/32 (2006.01)
  C02F 103/10 (2006.01)

(52) U.S. Cl.
  CPC ............ *B01D 17/047* (2013.01); *B01D 17/12* (2013.01); *C02F 9/00* (2013.01); *C02F 1/24* (2013.01); *C02F 1/385* (2013.01); *C02F 1/40* (2013.01); *C02F 1/56* (2013.01); *C02F 2101/32* (2013.01); *C02F 2103/10* (2013.01); *C02F 2209/01* (2013.01)

(58) Field of Classification Search
  CPC ......... B01D 17/047; B01D 17/12; C02F 1/24; C02F 1/40; C02F 9/00; C02F 1/385; C02F 1/56; C02F 2101/32; C02F 2103/10; C02F 2209/01; C02F 1/38; B03D 1/085; B03D 1/1412; B03D 1/1456; B03D 2203/006; B03D 1/02; B03D 1/028; B03D 1/14; B03D 3/06
  USPC .............. 210/703, 801, 221.2, 519, 521, 540
  See application file for complete search history.

(56) References Cited

U.S. PATENT DOCUMENTS

| | | | |
|---|---|---|---|
| 2,782,929 A * | 2/1957 | Colket | B01D 17/0211 210/540 |
| 3,318,448 A | 5/1967 | Fryer | |
| 3,396,512 A * | 8/1968 | McMinn | B01D 17/042 96/159 |
| 3,526,585 A | 9/1970 | Camp | |
| 3,623,608 A | 11/1971 | Waterman | |
| 3,764,008 A | 10/1973 | Darley et al. | |
| 3,784,468 A | 1/1974 | Garcia et al. | |
| 3,933,654 A * | 1/1976 | Middelbeek | B01D 17/0211 210/521 |
| 3,939,067 A | 2/1976 | Huisman | |
| 3,954,415 A | 5/1976 | Davitt | |
| 3,971,719 A * | 7/1976 | Peters | B01D 17/0214 210/540 |
| 4,110,215 A | 8/1978 | Bramlett | |
| 4,123,365 A * | 10/1978 | Middelbeek | B01D 17/0211 210/521 |
| 4,132,651 A * | 1/1979 | deJong | B01D 17/0211 210/522 |
| 4,337,069 A | 6/1982 | German | |
| 4,352,732 A | 10/1982 | Massicotte | |
| 4,394,258 A | 7/1983 | Zipperian | |
| 4,396,508 A * | 8/1983 | Broughton | B01D 17/0211 210/802 |
| 4,399,039 A | 8/1983 | Yong | |
| 4,424,112 A | 1/1984 | Rendall | |
| 4,425,277 A | 1/1984 | Smith | |
| 4,436,617 A | 3/1984 | Moore et al. | |
| 4,450,072 A | 5/1984 | Suplicki | |
| 4,451,184 A | 5/1984 | Mitchell | |
| 4,519,899 A | 5/1985 | Oertle et al. | |
| 4,545,892 A | 10/1985 | Cymbalisty | |
| 4,613,431 A | 9/1986 | Miller | |
| 4,769,186 A | 9/1988 | Raybon | |
| 4,783,268 A | 11/1988 | Leung | |
| 4,800,025 A | 1/1989 | Bibaeff | |
| 4,842,777 A | 6/1989 | Lamort et al. | |
| 4,981,582 A | 1/1991 | Yoon et al. | |
| 5,012,984 A | 5/1991 | Ishikawa | |
| 5,022,984 A | 6/1991 | Pimley | |
| 5,066,388 A | 11/1991 | Ross | |
| 5,110,457 A | 5/1992 | Krawl | |
| 5,118,408 A | 6/1992 | Jansen | |
| 5,145,256 A | 9/1992 | Wiemers et al. | |
| 5,156,745 A * | 10/1992 | Cairo, Jr. | B01D 17/0205 210/703 |
| 5,158,678 A | 11/1992 | Broussard | |
| 5,188,726 A | 2/1993 | Jameson | |
| 5,277,803 A | 1/1994 | Broussard | |
| 5,332,100 A | 7/1994 | Jameson | |
| 5,340,467 A | 8/1994 | Gregoli et al. | |
| 5,376,266 A | 12/1994 | Broussard | |
| 5,405,223 A | 4/1995 | Sirevag | |
| 5,415,776 A * | 5/1995 | Homan | B01D 17/0208 210/519 |
| 5,460,270 A | 10/1995 | Chan et al. | |
| 5,484,534 A | 1/1996 | Edmondson | |
| 5,494,584 A | 2/1996 | McLachlan | |
| 5,516,434 A | 5/1996 | Cairo et al. | |
| 5,656,173 A | 8/1997 | Jordan et al. | |
| 5,660,718 A | 8/1997 | Chudacek et al. | |
| 5,766,484 A | 6/1998 | Petit et al. | |
| 5,811,013 A | 9/1998 | Ito | |
| 5,879,541 A | 3/1999 | Parkinson | |
| 5,923,012 A | 7/1999 | Bourke et al. | |
| 5,935,445 A | 8/1999 | Febres | |
| 5,935,447 A | 8/1999 | Febres et al. | |
| 6,004,455 A | 12/1999 | Rendall | |
| 6,007,708 A | 12/1999 | Allcock et al. | |
| 6,059,977 A | 5/2000 | Rowney | |
| 6,106,733 A | 8/2000 | Wood | |
| 6,337,023 B1 | 1/2002 | Broussard | |
| 6,527,960 B1 | 3/2003 | Bacon | |
| 6,709,500 B1 * | 3/2004 | West | B01D 17/06 96/216 |
| 6,821,060 B2 | 11/2004 | McTurk et al. | |
| 6,935,367 B2 | 8/2005 | Cook | |
| 7,135,107 B2 | 11/2006 | Palmer | |
| 7,416,671 B2 | 8/2008 | Bozak et al. | |
| 7,531,099 B1 * | 5/2009 | Rhodes | B01D 17/0214 210/522 |
| 7,569,137 B2 | 8/2009 | Hyndman et al. | |
| 7,624,877 B2 | 12/2009 | Bourke | |
| 7,727,384 B2 | 6/2010 | Strand | |
| 8,137,566 B2 * | 3/2012 | Bozak | B01F 25/31243 210/708 |
| 8,147,682 B2 | 4/2012 | Lahaie et al. | |
| 8,404,121 B2 | 3/2013 | Bias et al. | |
| 8,778,159 B2 * | 7/2014 | Liverud | B01D 17/0211 210/521 |
| 8,834,724 B1 | 9/2014 | Richerand | |
| 9,334,175 B2 * | 5/2016 | Bozak | C10G 1/045 |
| 10,654,727 B2 * | 5/2020 | Bozak | B01D 17/0205 |
| 2005/0189293 A1 * | 9/2005 | Bernard | B01D 19/0057 210/519 |
| 2007/0114183 A1 | 5/2007 | Lee et al. | |
| 2008/0277318 A1 | 11/2008 | Bozak | |
| 2012/0145642 A1 | 6/2012 | Bozak et al. | |
| 2012/0298587 A1 | 11/2012 | Bozak | |
| 2013/0284677 A1 | 10/2013 | Snydmiller et al. | |
| 2022/0219099 A1 * | 7/2022 | Seguin | B01D 17/0205 |

FOREIGN PATENT DOCUMENTS

| | | |
|---|---|---|
| CA | 2055213 | 5/1993 |
| CA | 2174801 | 10/1996 |
| CA | 2159514 | 3/1997 |
| CA | 2241304 | 1/1999 |
| CA | 2229970 | 5/1999 |
| CA | 2230306 | 8/1999 |
| CA | 2319566 | 8/1999 |
| CA | 2407869 | 12/2001 |
| CA | 2420034 | 8/2004 |
| CA | 2453697 | 6/2005 |
| CA | 2510099 | 1/2006 |
| CA | 2527543 | 5/2007 |
| CA | 2531007 | 6/2007 |
| CA | 2632849 | 6/2007 |

(56) References Cited

FOREIGN PATENT DOCUMENTS

| | | |
|---|---|---|
| CA | 2534746 | 7/2007 |
| CA | 2685084 | 12/2008 |
| CA | 2594182 | 1/2009 |
| CA | 2634748 | 1/2009 |
| CA | 2653493 | 7/2009 |
| CA | 2689729 | 7/2011 |
| CA | 2819713 | 6/2012 |
| CA | 2857843 | 2/2015 |
| DE | 4312725 | 3/1994 |
| DE | 102005008743 | 9/2005 |
| GB | 2088234 | 6/1982 |
| WO | 1992012785 | 8/1992 |
| WO | 9906891 | 2/1999 |
| WO | 2006134235 | 12/2006 |
| WO | 2011082498 | 7/2011 |
| WO | 2012000116 | 1/2012 |

OTHER PUBLICATIONS

"Jameson Cell—Principles of Operation", pp. 1-3, <www.jamesoncell.com> [downloaded from the internet but published at least as early as the priority date of the current application.].

Information sheet from Vortex Ventures Inc. titled "Lobestar Mixing Eductor For Liquid and Slurry Applications", [downloaded from the internet and published at least as early as Sep. 21, 2005.].

Collections Canada: "The Karl Clark Process"; Webpage; Accessed Mar. 7, 2013.

Gforce Consulting Engineers: "The MKI Plant" [at least as early as the priority date of the current application.].

GEA Mechanical Equipment: "Slop Oil Recovery"; Brochure; Oelde, Germany [at least as early as the priority date of the current application.].

Vortex Ventures Inc: "Spintop Hydrocyclone" [at least as early as the priority date of the current application.].

Xu et al.: "Thickening and disposal of oil sand tailings;" Mining Engineering, v. 55 No. 11, p. 33-9, Nov. 2003.

"API Oil Water Seperator" Wikipedia, [at least as early as the priority date of the current application.].

Science Direct: "Innovative design and study of an oil-water coupling separation magnetic hydrocyclone" vol. 213, p. 389-400, Apr. 15, 2019.

Innovation and Technology: "Karl Clark Process" [at least as early as the priority date of the current application].

Kasperski, Aostra Journal of Research: "Review of properties and treatment of oilsands tailings" 8 (1992) 11.

* cited by examiner

FLUID TREATMENT SEPARATOR AND A SYSTEM AND METHOD OF TREATING FLUID

TECHNICAL FIELD

Fluid separating. In particular, treatment of tailings, for example tailings from tailings ponds resulting from oil sands production.

BACKGROUND

In oil sands production, bitumen may be extracted from a mixture that is approximately 10% bitumen, 80% sand, and 10% fine tailings. The fine tailings are generally deposited in a tailings pond. However, fine tailings will not fully settle in these tailing ponds. It is believed that the electrostatic interactions between the suspended particles, which are still contaminated with hydrocarbons, prevent this from occurring. These tailing ponds have become an environmental liability for the companies responsible.

The oil sands tailings ponds constitute an unanticipated but persistent environmental and economic problem. They reflect process inefficiencies in the bitumen extraction methods currently used. The problem has been mitigated by the industries to some degree, but there are many ponds that still present a major challenge for reclamation. Recent studies have been published that address the treatment of tailings as they are produced, in order to avoid the need for large settling and storage areas.

The applicant has developed methods and apparatus for providing a mixture of suspended solids and hydrocarbon froth, as disclosed in, for example, U.S. Pat. No. 8,137,566 and US Patent Publication No. 20120298587, both of which are incorporated by reference. It is desired to cause the suspended solids to combine and settle, and allow the hydrocarbon froth to float and be recovered.

It is known that mixing of fluids is important for causing collisions of suspended particles to cause suspended particles to combine and settle. However, improved mixing methods and apparatus are still desired.

SUMMARY

There is provided in an embodiment a fluid treatment separator having a separation chamber having an oil outlet and a water chamber having a water outlet below the height of the oil outlet. A fluid passage connects between the separation and water chambers. The fluid passage is below the height of the water outlet. There is a centrifuge flow separator in the separation chamber. A mixed fluid inlet is in fluid connection with the centrifuge flow separator for providing mixed fluids to the separation chamber.

In various embodiments, there may be included any one or more of the following features: a centrifuge flow diffuser oriented to direct mixed fluids into the centrifuge flow separator; the centrifuge flow separator has an upper opening and a lower opening, the upper opening having an area smaller than the lower opening; the oil outlet further comprises an oil weir, and the height of the oil outlet is defined by a height of a top surface of the oil weir; the water outlet further comprises a water weir, and the height of the water outlet is defined by a height of a top surface of the water weir; the centrifuge flow separator comprises a centrifuge cone; the centrifuge flow diffuser is positioned at the lower opening of the centrifuge flow separator; the centrifuge flow diffuser comprises a ring diffuser; the separation and water chambers are sections of a tank having a top and bottom, and the separation and water chambers are divided by a partition in the tank; the fluid passage is defined by an opening between a bottom of the partition and the bottom of the tank; a second opening between a top of the partition and the top of the tank; flow stabilization vanes are arranged in the separation chamber adjacent to the upper opening of the centrifuge flow separator; a density-float sensor adjacent to the upper opening of the centrifuge flow separator; a fluid treatment system include the fluid treatment separator as described above and a phase separator upstream from the mixed fluid inlet for mixing fluids to form the mixed fluids; a flocculant source and a flocculant injection quill configured to add flocculant upstream of the phase separator to add flocculants into a fluid stream entering the phase separator; the phase separator further comprises a pump; a port for admitting gas into the phase separator; the gas is air; a mixing chamber of the phase separator having a length and an internal diameter, and in which the ratio of the length to internal diameter of the mixing chamber is between the range of 20:1 and 60:1; and the ratio of the length to internal diameter of the mixing chamber is between 50:1 and 60:1.

There is provided in an embodiment a fluid treatment system. There is a first fluid treatment separator as described in the first paragraph of this summary and a second fluid treatment separator also as described in the first paragraph of this summary, in which the water outlet of the first fluid treatment separator is in fluid connection with the mixed fluid inlet of the second fluid treatment separator.

In various embodiments, there may be included any one or more of the following features: a phase separator upstream from the mixed fluid inlet of the first fluid treatment separator.

There is provided in an embodiment a method of treating fluid. A fluid treatment separator is provided. The fluid treatment separator has a separation chamber having an oil outlet and a water chamber having a water outlet below the height of the oil outlet. A fluid passage connects between the separation and water chambers, the fluid passage is below the height of the water outlet. There is a centrifuge flow separator in the separation chamber. Mixed fluids are directed into the centrifuge flow separator.

In various embodiments, there may be included any one or more of the following features: the fluid treatment separator further comprises a centrifuge flow diffuser oriented to direct mixed fluids into the centrifuge flow separator, and the method further includes directing mixed fluids through the centrifuge flow diffuser into the centrifuge flow separator; and the centrifuge flow separator further includes an upper opening and a lower opening, the upper opening having an area smaller than the lower opening.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Tailings may contain primarily both hydrocarbons and solids, for example mineral material, such as rock, sand, silt and clay. Because of the hydrocarbon contamination of the tailings stored in tailings ponds, the process below is particularly useful in reclaiming these ponds by removing the hydrocarbon contamination, and using the decontaminated tailings to return land to its natural state. However, the apparatus and method may also be applied to any fluid having components to be separated, such as an oil-water mixture, or oil-water-solid mixture, and oil including hydrocarbons. In some embodiments the apparatus and method may treat emulsions, for example directly off of the field bypassing a free water knock out. In some embodiments feed is supplied from a tank farm on site. The fluid to be treated may comprise tailings from deep within a tailings pond, without dilution, so long as the tailings are pumpable. If the tailings are not pumpable, they may be made pumpable by dilution with water. Fluid from a skim oil tank may be treated. In general, the apparatus and method disclosed herein may be used to separate immiscible fluids such as oil and water.

Figure 1:
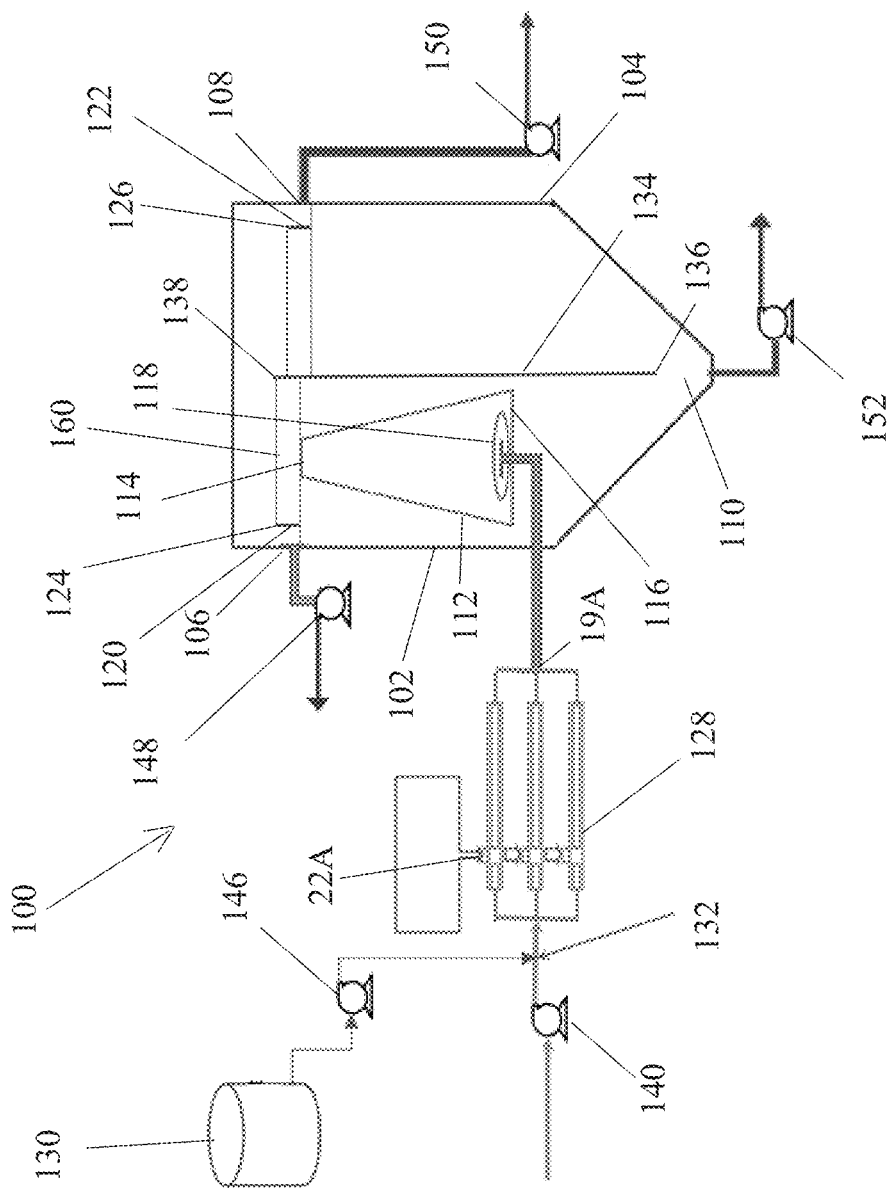
FIG. 1 is a schematic view of a fluid treatment system according to one embodiment.
Figure 2:
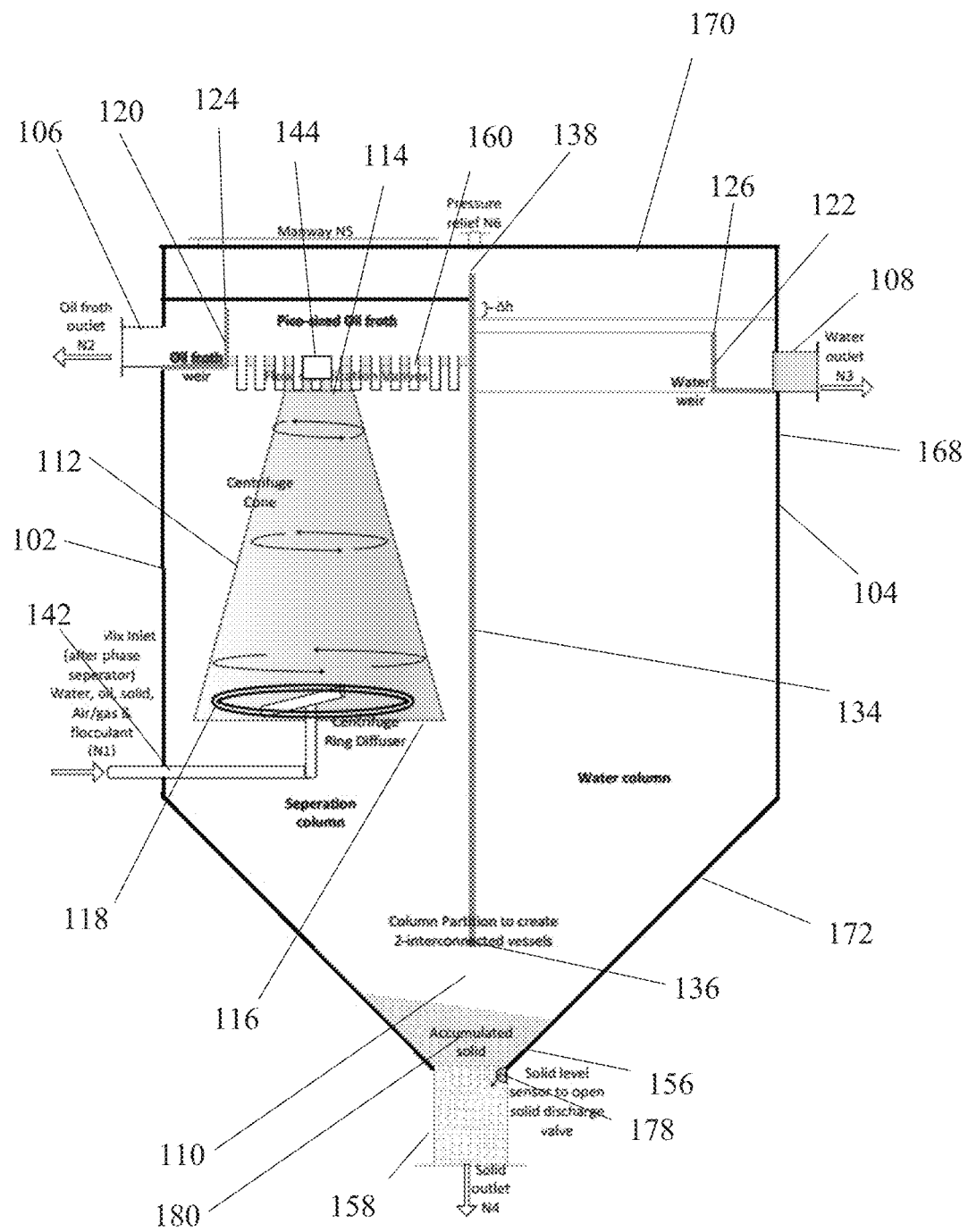
FIG. 2 is a schematic cross-section view of a fluid treatment separator according to one embodiment having a single tank divided by a divider into separation and water chambers.

FIGS. 1 and 2 show a fluid treatment system 100 including a fluid treatment separator 168 (FIG. 2) having a separation chamber 102 having an oil outlet 106 and a water chamber 104 having a water outlet 108 below the height of the oil outlet 106. The fluid treatment separator provides an apparatus and method of fluid treatment of a feed of oil, water and solid. A fluid passage 110 connects between the separation and water chambers. The fluid passage 110 is below the height of the water outlet. As shown in FIG. 1, the separation and water chambers 102, 104 are sections of a tank of the fluid treatment separator 168 having a top 170 and bottom 172 (FIG. 2). The separation and water chambers 102, 104 are divided by a partition 134 in the tank of the fluid treatment separator 168. The fluid passage 110 is defined by an opening between a bottom 136 of the partition 134 and the bottom 172 of the tank of the fluid treatment separator 168. The fluid passage allows water and other liquids to travel below the partition between the two chambers. There is a second opening between a top 138 of the partition 134 and the top 170 of the tank of the fluid treatment separator 168 which allows gases to travel above the partition between the two chambers.

A centrifuge flow separator 112 is positioned inside the separation chamber 102 downstream of a mixed fluid inlet 142. The mixed fluid inlet 142 is in fluid connection with the centrifuge flow separator 112 for providing mixed fluids to the separation chamber 102. A centrifuge flow diffuser 118 is connected to the mixed fluid inlet 142 and is oriented to direct mixed fluids into the centrifuge flow separator 112. The centrifuge flow separator 112 has an upper opening 114 and a lower opening 116. As shown in FIG. 2, the upper opening 114 has an area smaller than the lower opening 116. The oil outlet 106 includes an oil weir 120, and the height of the oil outlet 106 is defined by a height of a top surface 124 of the oil weir 120. The water outlet 108 includes a water weir 122 and the height of the water outlet 108 is defined by a height of a top surface 126 of the water weir 122.

Figure 4:
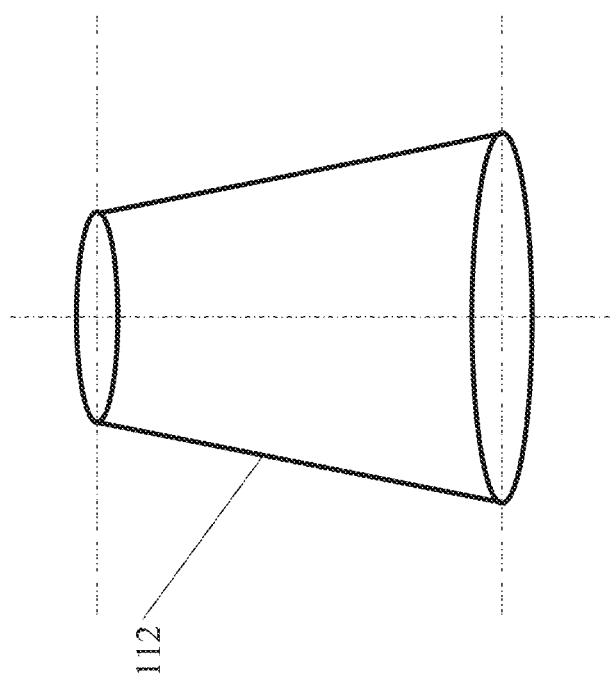
FIG. 4 is an isometric view of an embodiment of a centrifuge cone.

The centrifuge flow diffuser 118 is positioned at the lower opening 116 of the centrifuge flow separator 112. As shown in FIG. 2, the centrifuge flow separator 112 is a centrifuge cone and the centrifuge flow diffuser 118 is a ring diffuser. FIG. 4 shows the cone-shape chamber 112 to enhance centrifuge acceleration. In other embodiments, a standard cylinder or similar component having a circular or oval cross-section may also be used instead of a centrifuge cone. In the case of low oil-content waters, cones or cylinders of different diameters can be used as the centrifuge flow separator to build a suitable oil layer thickness to avoid excess water carryover while still maintaining an acceptable downward flow velocity with respect to vessel cross sectional area. Various designs of centrifuge flow diffuser may be used in place of a diffuser ring. In another embodiment, the centrifuge flow diffuser may be any mechanism that orients the inlet flow to create a centrifugal flow pattern within the cone or cylinder. This will cause the air and oil to concentrate in the center while the clean water migrates to the outside within the cylinder and cone boundary.

As shown in FIG. 1, there is a phase separator 128 upstream of the ring diffuser 118 for mixing fluids prior to being diffused into the centrifuge cone 112 through the ring diffuser 118. The phase separator 128 includes a pump 140 and a port 22A for admitting gas into the phase separator. The gas may be air. A flocculant source 130 and a flocculant injection quill 132 are configured to add flocculant upstream of the phase separator 128 to introduce flocculants into the fluid stream entering the phase separator 128.

Figure 5:
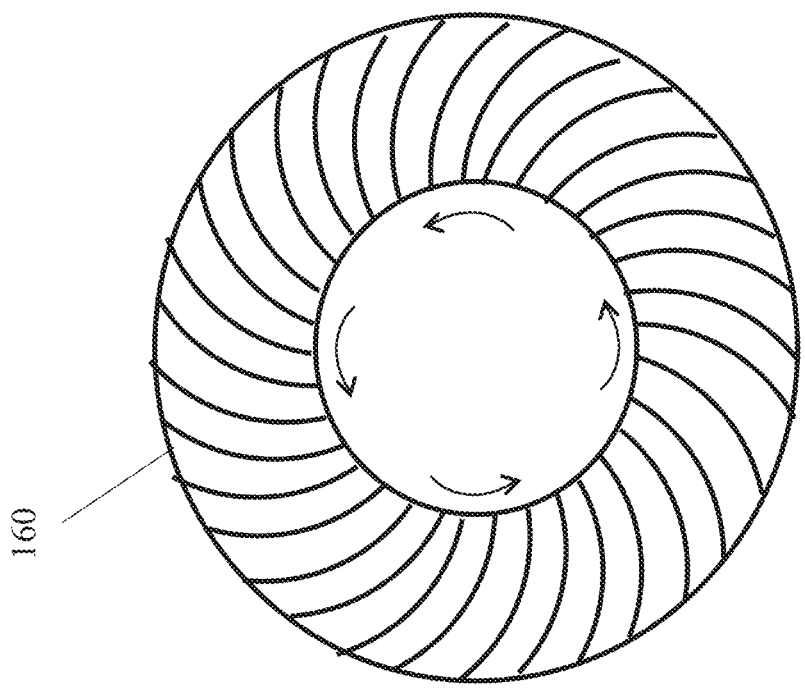
FIG. 5 is a top view of an embodiment of flow stabilizer vanes.

Flow stabilization vanes 160 (FIG. 2) are arranged in the separation chamber adjacent to the upper opening 114 of the centrifuge cone 112. A density-float sensor 144 is also provided adjacent to the upper opening 114 of the centrifuge cone 112. Referring to FIG. 5, the flow stabilizer vanes 160 are shown. The vanes 160 stop the centrifugal flow to allow further phase separation to happen. The air/gas releases from the working surface to the atmosphere at the top of the tank of the fluid treatment separator 168. The oil droplet froth overflows the oil-weir 120 and flows out of the oil outlet nozzle 106. The water condenses to go down outside of the cone and displaces the water in the water column 104 to overflow the water-weir 122 and flow out of water outlet nozzle 108.

As shown in FIG. 1, a flocculant pump 146 is used to pump flocculant into the system. There are oil, water and solid pumps 148, 150 and 152, respectively, that discharge oil, water and solids from the system once those substances exit the oil outlet 106, the water outlet 108 and solid outlet 158, respectively. The flocculant may be, for example, an anionic polymer. Both cationic and anionic polymers can be used as flocculants. Anionic polymers for use as flocculants aids are preferred.

In certain embodiments, the fluid treatment system 100 may operate as follows. The fluid treatment separator 168 may be described as a buoyancy-enhanced flotation cell or BEFC. The operation of the buoyancy-enhanced flotation cell is conducted by supplying a feed into the flotation cell 168, which is specially designed to enhance the buoyancy of oil droplets to better disengage the linkage between water and oil droplets and at the same time to use a flocculant polymer and centrifugal g-force effect to demulsify the emulsion state of water and fine solid particles.

The feed, having an oil concentration and fine solid content, is pumped through a number of phase separators, where the feed turns into froth, thanks to its design induced pressure-drop, which induces the ambient air or blanket gas into the working fluid in an air-liquid very fine mixing chamber.

The frothed working fluid flows into the flotation cell 168, which divides into 2 interconnected vessels: the water chamber, or water column, 104 and the separation chamber, or separation column, 102, the two columns being separated by the partition wall 134. This design allows separation by three different densities having the following movements:
  a. Less density than water: upward movement in the separation column 102.
  b. Higher density than water: downward movement in the separation column 102.
  c. Equal density to the water: overflows out through water weir of water column 104.

In the separation column 102, the working fluid goes through the ring-centrifuge diffuser 118 to create a circulation flow inside the centrifuge cone-shape chamber 112 to produce the centrifuge acceleration, where the oil droplets in bubbles get higher buoyancy and move upward, whereas fine particles are pulled by g-forces and move downward. The oil froth is collected at the oil weir 120 after passing the flow-stabilizing vanes 160 at the top of the separation column 102, and then flows out at oil outlet nozzle 106. The clean water is separated at separation column 102, moves to water column 104, is collected at water weir 122 of water column, then overflows out at water outlet nozzle 108. The cumulative fine solid particles 180 (FIG. 2) are collected at the bottom of BEFC 168, then discharged via solid outlet nozzle 158. The water column and the separation column are adjacent to avoid high underflow velocities with respect to vessel cross section that can affect oil removal.

The 3-phase oil-water-solid separation is occurring in the BEFC continuously and automatically with large variation of oil and solid content in the feed.

The feed is supplied from a phase separator that uses energy from fluid passing through a restriction to affect a phase separation. The feed comprises a foam mixture of oil, water and gas in the froth and flocculated fine solid particles.

The flow rate and pressure of the feed into the flotation cell is controlled to maintain the working fluid centrifugal flow in the separation column of the flotation cell within the predetermined range to ensure the sufficient retention time for maximizing the phase separation.

The working fluid flowrate into the flotation cell is monitored by sensing the centrifugal force of working fluid in the flotation cell. The centrifugal pressure is sensed at a top of centrifuge cone of the flotation cell.

The oil phase is removed from the flotation cell over a weir after being stabilized from the centrifugal flow. This allows time for the water to drop and settle down from the high dynamic centrifuge flow with oil droplets. The feed is supplied into the flotation cell at the bottom of the centrifuge cone. The feed is injected into the cone 112 in the form of circulation flow using the ring centrifuge diffuser 118. The ring centrifuge diffuser 118 rotates under the supplied fluid energy to provide the centrifugal flow acceleration.

Figure 6:
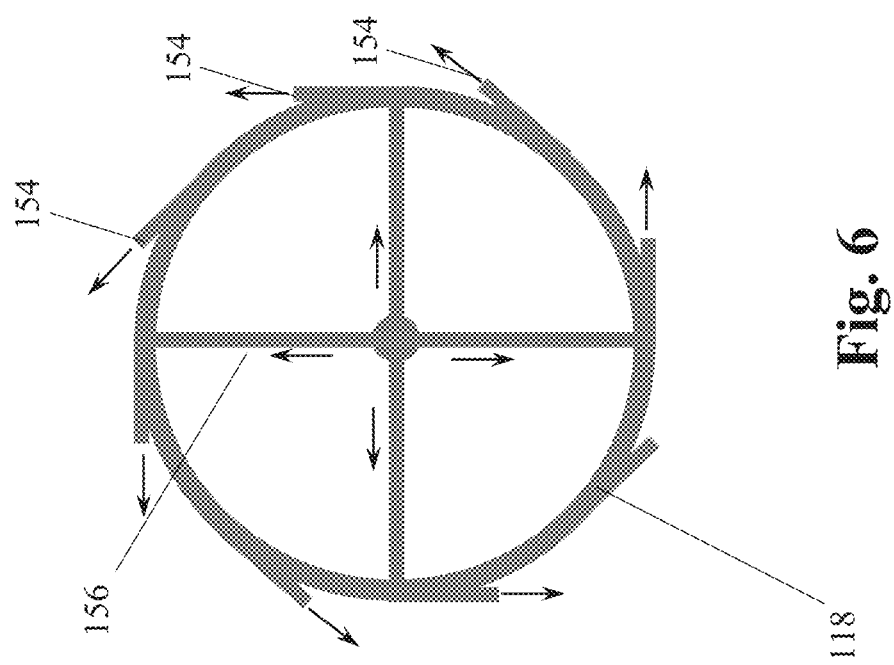
FIG. 6 is top view of a centrifuge diffuser ring.

As shown in FIG. 6, the diffuser ring 118 has a central open for receiving mixed fluid, which is connected to radially extending pipes 156 that connect to a number of outlets 154. The outlets 154 are oriented to direct flow perpendicularly to the circumference of the ring diffuser. The outlet can be oriented to direct flow in a clockwise or counterclockwise direction. Different numbers of fluid outlets may be used. Fluid flow in the diffuser ring 118 is shown with the arrows in FIG. 6.

In some embodiments there is a method of fluid treatment of a feed comprising oil, fine solid particles and water. The feed is supplied into the buoyancy-enhanced flotation cell (BEFC) 168. The feed has an oil and solid concentration. The flotation cell 168 has a 2-interconnected-vessel system, one directly connected with the inlet is the separation column 102 and the other one is the water column 104. The conical bottom outlet of the BEFC 168 is the cumulative solid discharge 158. The separation column 102 has the centrifuge ring diffuser 118 and the centrifuge cone 112, which produce the feed circulation flow movement within the centrifuge cone. The centrifugal acceleration creates g-force to separate the flocculated fine solid particles downward to the bottom solid outlet nozzle 158 and the centrifuge flow separates an oil phase from the working fluid where it moves closer the cone's rotational center line. At the top of the cone 112, the centrifuge flow is stabilized by the vanes 160 and the oil phase froth becomes buoyancy-enhanced and will overflow the oil-weir 120, which is higher than the water-weir 122, and then can be removed from the BECF 168 through the oil outlet nozzle 106. The separated water will displace water in the water column 104, and then overflow through water-weir 122 to the water outlet nozzle 108.

The fluid treatment process may be controlled through the flow rate and pressure of the feed stream to attain the optimal centrifuge effect in the separation column of BEFC 168 within a large range of variations in the oil and solid concentration of the feed.

Polymer flocculant is injected into the feed flow after the motive pump 140, but before the phase separator 128 to well mix with fine solid particles in the mixing chamber of phase separator 128 to make them flocculated when entering the BEFC 168. The feed is supplied through the phase separator 128 that uses energy from fluid passing through a restriction to create bubbles to demulsify the emulsion for improving the phase separation. The feed comprises a foam mixture of oil, water and gas or air.

Figure 7:
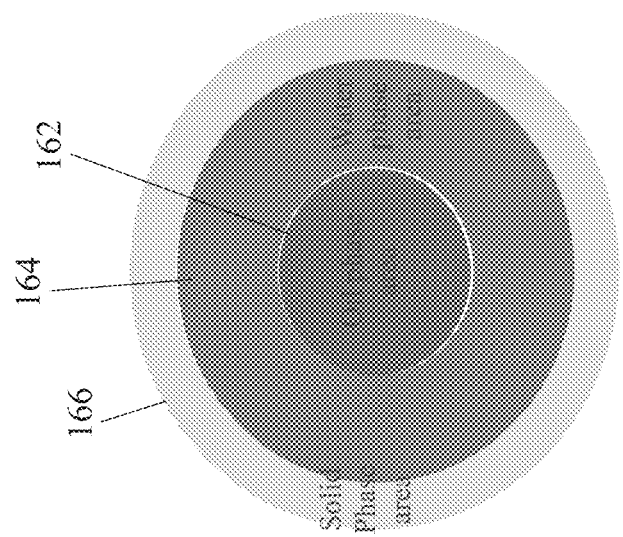
FIG. 7 is a cross-section view showing the phase separation distribution within the centrifuge cone of FIG. 4.

The BEFC 168 is designed in the shape of 2-interconnected vessels, one being the separation column 102, where the feed stream comes into the BEFC and is equipped with centrifuge assembly and to collect the oil froth which over-flows the oil-weir 120 at the top of the separation column. The water column 104 allows for the collection of displaced water from the separation column 102 which over-flows the water-weir 122 at the top of the water column. The BEFC 168 in FIG. 2 is designed in the shape of conical bottom for collecting out the cumulative flocculated fine solid particles. The BEFC conical bottom solid discharge nozzle 158 is designed with solid level sensor 178 to open the solid discharge valve when the solid level reaches the level set-point. The centrifuge-ring diffuser 118 (FIG. 6) is designed to create the circulation flow inside the centrifuge cone to produce the g-force for improving the separation as shown in FIG. 7. The separation column centrifuge system of the BEFC 168 includes the centrifuge cone 112 (FIG. 4) to create the circulation flow inside the centrifuge cone to produce the g-force for improving the separation as shown in FIG. 7. The separation column centrifuge system of BEFC 168 also includes the centrifuge-flow stabilizer vanes 160 (FIG. 5) to slow and to stop the centrifuge flow to create the oil-water phase separation at the oil-weir height level, to give separated water time to go down through the path outside of the centrifuge cone. The centrifugal circulation flow creates g-force separation and also enhances the buoyancy of the oil froth. The resulting oil froth phase is removed from the flotation cell over the oil-weir 120. The feed is supplied into the flotation cell 168 at the bottom of the centrifuge cone 112. The feed is at least partially separated across the release from centrifuge cone 112 due to the density difference with the water column. The less-dense-than-water objects move upward, the more-dense-than-water objects move downward, and the separated water displaces the water in the water column.

Figure 3:
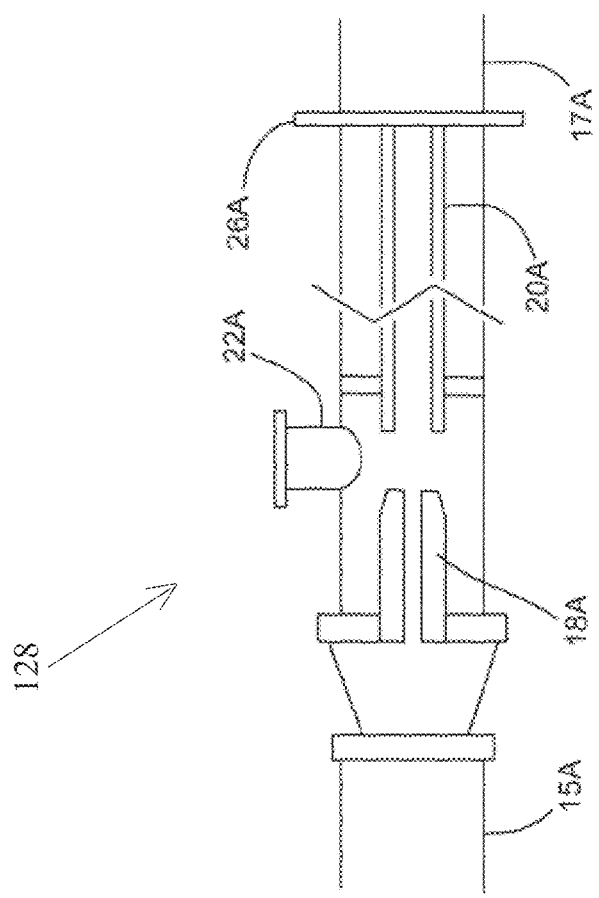
FIG. 3 is a cross-section of an embodiment of a phase separator.
Figure 8:
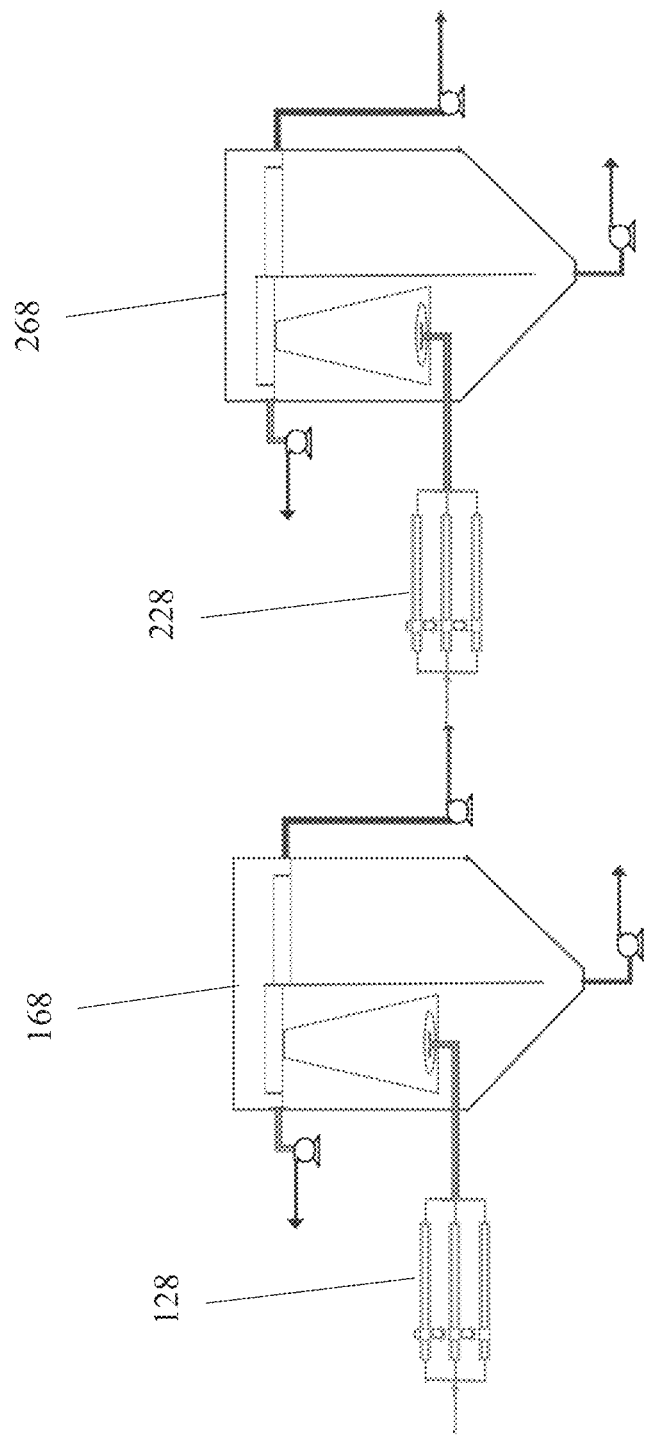
FIG. 8 is a schematic view of a fluid treatment system including multiple fluid treatment separators connected together.

As shown in the embodiment in FIG. 8, the fluid treatment system includes a second flotation cell BEFC provided with an inlet of feed connected to water outlet nozzle 108, to separate more oil and solid contaminants after the first BEFC 168. The process disclosed in FIG. 1 may be repeated by supplying fluid removed from the first BEFC 168 into a second BEFC 268, which has the same structure of the first BEFC 168. A second oil froth phase is removed from oil-weir at the top of separation column of second BEFC 268. The principles of operation of the second BEFC are the same as the first BEFC 168. The fluid removed from the first BEFC 168 and supplied into the second BEFC 268 may first be passed through a second phase separator 228, which uses energy from fluid passing through a restriction to affect a phase separation. The phase separator agitates the fluid removed from the flotation cell in the presence of a gas to cause the fluid to foam. The details of each of the first and second phase separators 128, 228 and the first and second BEFCs 168, 268, may be the same as shown in FIGS. 1-3, and the structure of those items are not repeated in FIG. 8.

When used with more than one BEFC 168 in series, embodiments of the apparatus and method described may affect a cascading control philosophy to ensure optimal operation of an entire system of fluid treatment cells despite variations in feed oil concentration during treatment. Such variations are inevitable when dealing with tailings feeds, and are capable of upsetting an entire separation system operated by conventional means. This is because conventional multi-separator fluid treatment devices are either calibrated to treat feeds that have a constant oil concentration or are run passively with each tank draining by gravity into a subsequent tank. In the separation of bitumen from tailings and in other cases it may be difficult or impossible to directly monitor input oil concentration as oil is adsorbed tightly to bits of clay and mud in a type of suspension and is thus difficult to measure on the fly. Thus, embodiments of the disclosed methods and apparatuses are advantageous in that they indirectly measure changes in feed oil concentration by monitoring working fluid levels in each BEFC and automatically adjusting the flux of working fluid and solids through each BEFC to maintain a relatively constant and predetermined working fluid level in each flotation cell.

The number and size of phase separators may be selected independently from the vessel sizing. Vessel cross sectional area controls the amount of flow into the flotation cell. The number of phase separators will be determined based on the required process turn down ratio. For example, two phase separators may provide for a 2:1 turn down ratio.

As shown in FIG. 1, near the top of the tank of the fluid treatment separator 168, there is an oil-water interface surface. A working separation column monitor 144 is sensitive to oil-water interface surface variations in the separation column. The oil-water interface monitoring device 144 is placed at the top of the centrifuge cone 112 to monitor the performance of the separation column. The oil-water interface level monitor may be a density-float sensor. The density-flow sensor that measures the density of oil froth can be used to control both the motive pump (feed pump) and underflow pump. By speeding up or slowing down these pumps will in turn affect the thickness of the oil froth layer that forms in the top of the vessel. For example, too high a froth density which is indicative of too much water in the oil froth will result in the underflow pump speeding up in relation to the motive pump (feed pump) to draw down the oil/water interface within the reactor, reducing the water carryover with oil. Too thick an oil froth layer in the reactor will result in the underflow slowing down to force more oil froth over the weir, reducing the thickness of the oil froth layer.

As shown in FIG. 3, the phase separator 128 may in operation use energy from fluid passing through a restriction 18A to affect a phase separation, for example to strip oil from solids to produce an oil phase mixed with water and solids that may be dispersed on the surface of the working fluid. The oil phase may also contain water and solids, but upon dispersal on the surface of the working fluid, at least some of the water and solids, having been separated from the oil phase with the phase separator, will enter the working fluid of the flotation cell BEFC 168.

Embodiments of the apparatuses described are able to self-balance on feed entry of oil slugs and surges. Thus, when the inflow has a high oil fraction, more oil spills over the weir and the pumps on the outflow are controlled to reduce outflow of water to keep the water (working fluid) level within a predetermined range. When the inflow has a high-water fraction, a small amount of oil spills over the weir, and a relatively larger outflow of water is maintained by the weir height difference $\Delta h$ (FIG. 1).

In one example, the apparatus was able to accommodate for oil percentage fluctuations in the feed of between 1 and 10%, although almost any magnitude of fluctuation may be accommodated.

In some embodiments, the process control system for the BEFC 168 is very simple. The more flow rate and more pressure of feed, the dynamic of working fluid is increased, which means more centrifuge acceleration, more g-force and more separation occurs. The inlet feed flow is controlled by the pump 140, but the separated oil and water automatically overflow the weirs to be transferred further by motive pumps.

A solid level sensor 178 is equipped at the solid outlet 158 to open the solid discharge valve when the accumulated solid is higher than a defined set point.

An anionic polymer flocculant additive system including the flocculant source 130 and the flocculant pump 146 is used to inject flocculant into the feed through the injection quill 132 installed upstream of the phase separator(s) 128. In the phase separator 128, the feed will be well mixed with flocculant and make the fine solid particles flocculated when entering the BEFC.

Referring to FIG. 3, the phase separator 128 may comprise a conduit, a mixing chamber 20A, and the port 22A. The motive pump 140 (FIG. 1) having an inlet and an outlet may also be part of the phase separator. The inlet may be connected to a source of fluid having components to be separated. A conduit may be connected to the outlet of the motive pump. The conduit may have a discharge 19A (FIG. 1). A restriction 18A in the conduit may form a nozzle through which the fluid flows when the motive pump is operated. The restriction 18A may divide the conduit into an upstream end 15A between the motive pump and nozzle and a downstream end 17A that terminates at the discharge 19A. The conduit may have a mixing chamber 20A downstream of the nozzle and a port 22A for admission of gas into the mixing chamber 20A for example in an initial portion of the mixing chamber 20A, to cause the feed to foam. The motive pump 140, restriction 18A, mixing chamber 20A and port 22A together comprise the phase separator 128. By mixing air or blanket gas with the feed in a turbulent manner, the feed may be foamed, which facilitates removal of the oil phase from the surface of the working fluid. Induction of air/gas may produce bubbles in the stream that attach to each droplet of oil to remove the oil from the water or solid phases.

In the example shown, the mixing chamber 20A may terminate downstream at a transition 26A in the conduit 17A to a larger diameter portion of the conduit. The mixing chamber 20A may have a length to internal diameter ratio of at least 20:1 or 40:1, preferably in the range 50:1 to 60:1. Improved separation of the fluid components has been found to occur as the length to internal diameter of the mixing chamber 20A increases from 20:1 to 60:1. For example, by comparison with a conventional jet pump under the same testing conditions, a jet separator of the type disclosed here with a mixing chamber having a 40:1 length to diameter ratio (actual diameter; 43 mm) had an approximately 40% higher mass production of froth during treatment of oil sands tailings. The conventional jet pump had a mixing chamber with a length to diameter ratio of approximately 5:1 and actual diameter 44 mm. By same test conditions is meant: same feed material, same diameter piping on either side of the jet separator/jet pump, same flow rate and same pressure. The only difference, other than the minor difference in mixing chamber diameter between the two set ups, was the replacement of the jet separator described here with a conventional jet pump. It has been found that improved performance in terms of froth generation is obtained from a jet separator when the mixing chamber has a length to diameter ratio larger than a conventional jet pump, which generally have a mixing chamber with a length to diameter ratio of less than 20:1. Large improvements in the effectiveness of the mixing chamber 20A have not been measured for length to internal diameter ratios greater than 60:1. The mixing chamber 20A preferably has constant internal diameter along the length of the mixing chamber 20A. When the mixing chamber 20A does not have constant internal diameter, the internal diameter of the mixing chamber 20A, for the purpose of calculating the length to internal diameter ratio, may be the mean internal diameter. The internal diameter of the mixing chamber 20A may be selected so that the fluid exiting the restriction 18A undergoes turbulence and collision with all parts of the internal wall of the mixing chamber 20A. The mixing chamber 20A may need only begin after the fluid exiting the restriction 18A has expanded sufficiently to contact the walls of the mixing chamber 20A. Although the phase separator may not pump anything other than air from the port 22A, it may have the general design of a jet pump in terms of the relationship of the size of the mixing chamber to the restriction. In one embodiment, the phase separator pumps natural gas instead of air through port 22A. For example, the phase separator may induce entry, into the stream, of gas such as natural gas or nitrogen from the gas blanket (not shown) that may be provided over the components of the apparatus described herein during use. A gas blanket is conventionally set up using piping to all tanks and lines to exclude oxygen and ensure a non-explosive atmosphere.

The port 22A may be located downstream of the restriction 18A and before the mixing chamber 20A. The conduit immediately after the restriction 18A should have a diameter sufficient to accommodate the jet exiting the restriction 18A. The mixing chamber 20A may have an internal diameter that is less than the internal diameter of the conduit 15A (before the restriction 18A) and greater than the diameter of the restriction 18A. Hence, if the conduit 15A is a 16-inch pipe, and the restriction is 6 inches, then the mixing chamber may have an internal diameter between 6 inches and 16 inches, for example 12 inches. For a 12-inch internal diameter mixing chamber 20A, the mixing chamber 20A may be 40 feet long. For treatment of tailings, the diameter of the restriction 18A may be selected to provide a pressure in the conduit 15A before the restriction 18A of 75 psi to 150 psi. The conduit 14A after the transition 26A may have an internal diameter equal to the internal diameter of the upstream portion 15A of the conduit.

The feed or fluid having components to be treated may comprise solids such as tailings from a tailings pond, such as a tailings pond at a heavy oil mining facility. In an example, the fluid source may comprise a first submersible pump connected to pump fluid from a first portion of a tailings pond and a second submersible pump connected to pump fluid from a second portion of a tailing pond. The pumps respectively have outlets connected to the inlet of the motive pump 140. The 2nd pump may be deeper in the tailings pond than the 1st pump so that the weight percent of solids of fluid in the first portion of the tailings pond is less than the weight percent of solids of fluid in the second portion of the tailings pond.

The port 22A preferably comprises a valve, which may be controlled manually or automatically such as by a controller. When the port 22A is not open, a vacuum created in the conduit downstream of the pump may cause vibration within the pipe and poor separation of the fluid components. When the port 22A is opened sufficiently for the vibration to stop, the fluid components may be agitated and a phase separation may occur within the fluid so that oil may be stripped from solids. Gas, for example air, introduced through the port 22A may become entrained with the fluid components and tends to adhere to oil in the fluid. Thus, the phase separator agitates the fluid removed from the flotation cell in the presence of a gas to cause the fluid to foam.

The discharge 19A (FIG. 1) is disposed to discharge treated fluid into the BEFC 168. In some embodiments, other separation apparatus may be used instead of or in addition to the BEFC 168, such as a centrifuge, hydrocyclone or another fluid treatment apparatus comprising an additional motive pump, restriction 18A, mixing chamber 20A and port 22A. Any number of additional such secondary apparatus may be used as necessary to affect an adequate phase separation. Thus, the fluid treatment system may comprise a series of connected combinations of motive pump 10A, restriction 18A, mixing chamber 20A and port 22A connected together between a source of fluid 16 and may include multiple BEFCs 168. Fluid supplied into the fluid treatment separator 168 should be mixed fluid and supplied to the separator under motive force.

A cumulative slightly wet solid phase may be extracted from conical base of BEFC 168 and then pumped further to a solid collection bay. The wet solids may be allowed to dry or dried in various ways, such as with the addition of heat, but may also be allowed to drain. Once dried, the solids may be returned to a reclaimed mine site or subject to further processing, for example to extract minerals from the solids. Exemplary minerals that may be extracted include gold and titanium. Oil may be extracted from the BEFC 168 for example by spillover from the oil weir 120. The oil may be delivered to a pipeline or subject to further processing.

The disclosed fluid treatment devices may operate by pumping fluid using the motive pump 140 through the restriction 18A in the conduit 14A into the mixing chamber 20A downstream of the restriction 18A. Gas may be added into the fluid downstream of the restriction 18A in an initial portion of the mixing chamber 20A. The fluid is discharged from the conduit 14A into the flotation tank 168. A standard jet pump may be used as a phase separator prior to the flotation tank 168.

The fluid having components to be separated, such as tailings, may be supplied to the mixing chamber 20A through the port 22A from a source of the fluid such as from one of the submersible pumps. Motive fluid to be pumped by pump 140 may be water, for example supplied from a portion of a tailings pond through other pumps. The port 22A may comprise one or more openings in the conduit downstream of the restriction 18A but upstream of the mixing chamber 20A. If more than one opening is used, gas, for example air, may be supplied through one opening and the fluid to be treated through another opening. As many openings as required may be used. Flow through the port 22A may be regulated by a valve or valves. The term opening may be used here to denote a port. While air may be injected simply through the valve, a further conduit leading to a source of the fluid that is being treated may be required for the delivery of fluid to the port 22A.

Referring to FIG. 7, there is shown the cross-section of the centrifuge cone 112, showing the phase distribution under the centrifugal effect: the oil phase 162 is at the center line of the cone, and water phase 164 is in the middle and solid phase 166 is furthest out.

Embodiments of the apparatus described herein may be portable, for example if loaded as a module on a skid (not shown) with or without wheels, for transport to a work site. The apparatus may include a housing (not shown) such as a shed to protect system components from the elements. Oil removed from the BEFC or plural BEFCs may be combined and stored in a collection vessel (not shown), which may itself supply an on-site oil treater or disc stack centrifuge, for example. Embodiments of the methods and apparatuses disclosed herein may be implemented with little or no chemical and heat addition, and thus are expected to reduce the costs of implementation and make the process more environmentally friendly. In fact, the apparatuses and methods may be run at ambient temperature. Hydrocarbons separated during the process may be used to power the apparatus. Fluid entering the apparatus may have for example 10 000 ppm oil, and when finished the oil percentage in working fluids (water) may be 50 ppm or less. In demonstrations, each pass through a BEFC has been found to remove 80-95% of residual oil in the feed, although higher or lower removal percentages may be achieved. Embodiments of the apparatuses and methods disclosed have been found to reduce the amount of oil and water sent for disposal. Although not intended to be limiting, various applications of the apparatuses and methods disclosed herein include treating fluids used in water/polymer flooding to facilitate water disposal, water recovery or reuse, treating fluids used in in-situ heavy oil batteries to facilitate deep well brine injection, treating fluids intended for third party disposal wells to reduce oil injection into disposal wells as well as enhance oil and water separation to facilitate water deep well injection and reduce contaminated solids for disposal to extend the life of the well, and treating fluids from enhanced oil recovery to achieve a higher percentage of oil that can be sent to treatment resulting in increased sales oil production. Applications also include treatment of fluids from oil sands mining, heavy oil water disposal streams, and SAGD. The apparatuses disclosed herein may include a Fugitive Emission Management system.

Benefits of embodiments of the apparatus and methods may include, inter alia, the following. Oil may be extracted from an oily water/slurry at a low operating cost as the system processes the waste stream at ambient temperatures. A substantial reduction in chemical consumption for the client may be achieved. The self-balancing aspect of the apparatus and method allows handling of wide fluctuations of oil content with little effect on process efficiency or effluent quality which equates to less down time. The system may be simple and very robust, reducing maintenance issues. The system and method may be configured for a new installation or inserted into the clients existing infrastructure in most cases. The retention of oil from existing production may be increased and the percentage of oil to be re-injected as waste into disposal wells may be reduced. The apparatus and method may address existing waste stream accumulations as well as minimizing future issues. The apparatus and method may clean both the fines and accompanying process water immediately, recovering most of the available water for process recycling or release.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A fluid treatment separator comprising:
   a separation chamber having an oil outlet;
   a water chamber having a water outlet below a height of the oil outlet;
   a fluid passage connecting between the separation chamber and the water chamber, the fluid passage being below a height of the water outlet;
   a centrifuge flow separator in the separation chamber, the centrifuge flow separator having an upper opening and a lower opening, the upper opening having an area smaller than the lower opening; and
   a mixed fluid inlet in fluid connection with the centrifuge flow separator for providing mixed fluids to the separation chamber,
   and further comprising:
   i. a centrifuge flow diffuser positioned at the lower opening of the centrifuge flow separator; or,
   ii. flow stabilization vanes arranged in the separation chamber adjacent to the upper opening of the centrifuge flow separator.

2. The fluid treatment separator of claim 1 in which the oil outlet further comprises an oil weir, and the height of the oil outlet is defined by a height of a top surface of the oil weir.

3. The fluid treatment separator of claim 1 in which the water outlet further comprises a water weir, and the height of the water outlet is defined by a height of a top surface of the water weir.

4. The fluid treatment separator of claim 1 in which the centrifuge flow separator comprises a centrifuge cone.

5. The fluid treatment separator of claim 1 and comprising the centrifuge flow diffuser, wherein the centrifuge flow diffuser comprises a ring diffuser.

6. The fluid treatment separator of claim 1 in which the separation chamber and the water chamber are sections of a tank having a top and a bottom, and the separation and water chambers are divided by a partition in the tank.

7. The fluid treatment separator of claim 6 in which the fluid passage is defined by an opening between a bottom of the partition and the bottom of the tank.

8. The fluid treatment separator of claim 7 further comprising a second opening between a top of the partition and the top of the tank.

9. The fluid treatment separator of claim 1 further comprising a density-float sensor adjacent to the upper opening of the centrifuge flow separator.

10. A fluid treatment system, comprising:
the fluid treatment separator of claim 1; and
a phase separator upstream from the mixed fluid inlet for mixing fluids to form the mixed fluids.

11. The fluid treatment system of claim 10 in which the fluid treatment system further comprises a flocculant source and a flocculant injection quill configured to add flocculant upstream of the phase separator to add flocculants into a fluid stream entering the phase separator.

12. The fluid treatment system of claim 10 in which the phase separator further comprises a pump.

13. The fluid treatment system of claim 10 in which the phase separator further comprises a port for admitting a gas into the phase separator.

14. The fluid treatment system of claim 13 in which the gas is air.

15. The fluid treatment system of claim 10 in which the phase separator further comprises a mixing chamber having a length and an internal diameter, and in which the ratio of the length to the internal diameter of the mixing chamber is between 20:1 and 60:1.

16. The fluid treatment system of claim 15 in which the ratio of the length to the internal diameter of the mixing chamber is between 50:1 and 60:1.

17. A fluid treatment system, comprising:
a first fluid treatment separator comprising the fluid treatment separator of claim 1; and a second fluid treatment separator comprising the fluid treatment separator of claim 1, the water outlet of the first fluid treatment separator being in fluid connection with the mixed fluid inlet of the second fluid treatment separator.

18. The fluid treatment system of claim 17 further comprising a phase separator upstream from the mixed fluid inlet of the first fluid treatment separator.

19. A method of treating fluid, comprising:
providing a fluid treatment separator, the fluid treatment separator comprising:
a separation chamber having an oil outlet,
a water chamber having a water outlet below a height of the oil outlet,
a fluid passage connecting between the separation chamber and the water chamber, the fluid passage being below a height of the water outlet,
a centrifuge flow separator in the separation chamber, the centrifuge flow separator having an upper opening and a lower opening, the upper opening having an area smaller than the lower opening; and
directing mixed fluids into the centrifuge flow separator; and further wherein:
i. a centrifuge flow diffuser is positioned at the lower opening of the centrifuge flow separator; or
ii. flow stabilization vanes are arranged in the separation chamber adjacent to the upper opening of the centrifuge flow separator.

20. The method of treating fluid of claim 19, the method further comprising directing the mixed fluids through the centrifuge flow diffuser into the centrifuge flow separator.

* * * * *